(12) United States Patent
Okano et al.

(10) Patent No.: US 10,497,967 B2
(45) Date of Patent: Dec. 3, 2019

(54) NEGATIVE-ELECTRODE ACTIVE MATERIAL FOR NON-AQUEOUS SECONDARY BATTERY AND NON-AQUEOUS SECONDARY BATTERY

(71) Applicant: Panasonic Intellectual Property Management Co., Ltd., Osaka (JP)

(72) Inventors: Tetsuyuki Okano, Osaka (JP); Takayuki Nakatsutsumi, Osaka (JP); Mayumi Maenishi, Osaka (JP); Masahiro Takahata, Osaka (JP); Junko Matsushita, Osaka (JP); Akira Kano, Osaka (JP); Nobuhiko Hojo, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 93 days.

(21) Appl. No.: 15/959,290

(22) Filed: Apr. 23, 2018

(65) Prior Publication Data
US 2018/0337423 A1 Nov. 22, 2018

(30) Foreign Application Priority Data

May 16, 2017 (JP) .................................. 2017-097701

(51) Int. Cl.
*H01M 10/05* (2010.01)
*H01M 4/13* (2010.01)
(Continued)

(52) U.S. Cl.
CPC ......... *H01M 10/0525* (2013.01); *H01M 2/06* (2013.01); *H01M 4/133* (2013.01);
(Continued)

(58) Field of Classification Search
None
See application file for complete search history.

(56) References Cited

U.S. PATENT DOCUMENTS 5,320,878 A * 6/1994 Maya ..................... C23C 16/342
427/248.1
6,194,067 B1 * 2/2001 Hamada ................. H01M 4/587
428/367
(Continued)

FOREIGN PATENT DOCUMENTS

JP 2002-324550 11/2002
WO 1999/000325 1/1999

*Primary Examiner* — Scott J. Chmielecki
(74) *Attorney, Agent, or Firm* — McDermott Will & Emery LLP (57) ABSTRACT

A negative-electrode active material comprises a graphite including boron and nitrogen. A ratio R1 satisfies $0.5 \leq R1 \leq 1$, where $R1 = S_{BN}/S_B$, and $S_B$ denotes a total peak area of a boron 1s spectrum of the graphite obtained by X-ray photoelectron spectroscopy, and $S_{BN}$ denotes a peak area of a spectrum assigned to boron bonded to nitrogen in the boron 1s spectrum. A ratio R2 satisfies $0 < R2 \leq 0.05$, where $R2 = S_B/(S_B + S_C + S_N)$, and $S_C$ denotes a peak area of a carbon 1s spectrum of the graphite obtained by X-ray photoelectron spectroscopy, and $S_N$ denotes a peak area of a nitrogen 1s spectrum of the graphite obtained by X-ray photoelectron spectroscopy.

17 Claims, 5 Drawing Sheets

(51) Int. Cl.
*H01M 2/06* (2006.01)
*C01B 32/20* (2017.01)
*H01M 10/0525* (2010.01)
*H01M 4/133* (2010.01)
*H01M 4/583* (2010.01)
*H01M 4/134* (2010.01)
*H01M 4/66* (2006.01)
*H01M 4/525* (2010.01)
*H01M 4/02* (2006.01)
*C01B 32/205* (2017.01)

(52) U.S. Cl.
CPC .......... *H01M 4/134* (2013.01); *H01M 4/525* (2013.01); *H01M 4/583* (2013.01); *H01M 4/662* (2013.01); *C01B 32/20* (2017.08); *C01B 32/205* (2017.08); *H01M 2004/027* (2013.01); *H01M 2004/028* (2013.01)

(56) References Cited

U.S. PATENT DOCUMENTS

| | | | | |
|---|---|---|---|---|
| 6,485,864 B1* | 11/2002 | Miyazawa | .............. | C01B 32/20 423/448 |
| 2002/0192555 A1* | 12/2002 | Teshima | .............. | H01M 4/1393 429/231.8 |
| 2007/0215460 A1* | 9/2007 | Tojo | ........................ | C25B 1/245 204/245 |
| 2018/0151873 A1* | 5/2018 | Matsuno | ............. | H01M 4/0459 |

* cited by examiner

NEGATIVE-ELECTRODE ACTIVE MATERIAL FOR NON-AQUEOUS SECONDARY BATTERY AND NON-AQUEOUS SECONDARY BATTERY

BACKGROUND

1. Technical Field

The present disclosure relates to a non-aqueous secondary battery and a negative-electrode active material for use in the non-aqueous secondary battery.

2. Description of the Related Art

Carbon materials containing boron have been studied as negative-electrode materials for non-aqueous secondary batteries exemplified by lithium secondary batteries.

For example, International Publication No. WO 99/00325 discloses a carbonaceous powder and carbonaceous fiber the surfaces of which are covered with boron nitride. More specifically, the boron atomic concentration C(B), the carbon atomic concentration C(C), and the nitrogen atomic concentration C(N) of the disclosed carbonaceous powder and carbonaceous fiber in a surface region measured by X-ray photoelectron spectroscopy (XPS) satisfy 0.05<C(B)/(C(B)+C(C)+C(N))<0.3 and 0.05<C(N)/(C(B)+C(C)+C(N))<0.3. Also disclosed is a lithium secondary battery containing a negative-electrode active material with chemical stability improved in this way.

Japanese Unexamined Patent Application Publication No. 2002-324550 discloses a non-aqueous electrolyte secondary battery containing boron-containing graphite as a negative-electrode active material, wherein the ratio of an area S1 to an area S2 is 1.0 or less, wherein the area S1 is the area of a peak with the top in the range of 188 to 192 eV measured by X-ray photoelectron spectroscopy, and the area S2 is the area of a peak with the top in the range of 185 to 187 eV measured by X-ray photoelectron spectroscopy. Also disclosed is a non-aqueous electrolyte secondary battery with a high discharge capacity in which a film of a boron compound with very low electron conductivity on the surface of graphite to be used in the negative-electrode active material is decreased in this way.

SUMMARY

One non-limiting and exemplary embodiment provides a negative-electrode active material that can improve both discharge capacity and chemical stability.

In one general aspect, the techniques disclosed here feature a negative-electrode active material for a non-aqueous secondary battery. The negative-electrode active material comprises a graphite including boron and nitrogen. A ratio R1 satisfies $0.5 \leq R1 \leq 1$, where $R1 = S_{BN}/S_B$, and $S_B$ denotes a total peak area of a boron $1s$ spectrum of the graphite obtained by X-ray photoelectron spectroscopy, and $S_{BN}$ denotes a peak area of a spectrum assigned to boron bonded to nitrogen in the boron $1s$ spectrum. A ratio R2 satisfies $0 < R2 \leq 0.05$, where $R2 = S_B/(S_B+S_C+S_N)$, and $S_C$ denotes a peak area of a carbon $1s$ spectrum of the graphite obtained by X-ray photoelectron spectroscopy, and $S_N$ denotes a peak area of a nitrogen $1s$ spectrum of the graphite obtained by X-ray photoelectron spectroscopy.

A negative-electrode active material for a non-aqueous secondary battery according to an embodiment of the present disclosure can improve both discharge capacity and chemical stability.

It should be noted that general or specific embodiments may be implemented as an active material, a battery, a device, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The present inventors have found the following. In a negative-electrode active material described in International Publication No. WO 99/00325, coverage of the surface of graphite with boron nitride improves chemical stability but decreases discharge capacity. In a negative-electrode active material described in Japanese Unexamined Patent Application Publication No. 2002-324550, the proportion of a boron compound on the surface of graphite can be decreased to increase discharge capacity. However, a low proportion of the boron compound results in low chemical stability.

Thus, it is difficult in the related art to improve both of the discharge capacity and the chemical stability of a negative-electrode active material. The present inventors have extensively studied to improve both the discharge capacity and the chemical stability of a negative-electrode active material.

As a result of extensive studies, the present inventors have found that the use of a graphite containing boron in a particular form as a negative electrode of a non-aqueous secondary battery can achieve both high discharge capacity and high chemical stability. Although the reason for enabling both of the high discharge capacity density and chemical stability of a negative-electrode active material for a non-aqueous secondary battery containing such a boron-containing graphite is not completely clear, the present inventors guess the reason as described below. However, the present disclosure is not limited by the following discussion.

Embodiments of the present disclosure will be described in detail below. However, the present disclosure is not limited to these embodiments.

A negative-electrode active material for a non-aqueous secondary battery according to an embodiment of the present disclosure contains a graphite that contains boron and nitrogen. In a boron $1s$ spectrum of the graphite obtained by X-ray photoelectron spectroscopy, the ratio R1 (i.e., $S_{BN}/S_B$) of the peak area $S_{BN}$ of a spectrum assigned to boron bonded to nitrogen to the total peak area $S_B$ of the boron 1s spectrum is 0.5 or more.

A boron 1s spectrum obtained by X-ray photoelectron spectroscopy includes spectra assigned to boron in various bonding states, such as boron nitride, boron oxide, boron carbide, and solid solution of boron in graphite, and includes a plurality of peaks corresponding to these bonding states. The sum of the areas of these peaks (i.e., the total peak area $S_B$) is proportional to the total amount of boron in various bonding states present on the surface of graphite. A spectrum assigned to boron bonded to nitrogen refers to a spectrum having one or more peaks in the binding energy range of 189.0 to 192.0 eV in a boron 1s spectrum. The peak area $S_{BN}$ of a spectrum assigned to boron bonded to nitrogen is proportional to the amount of boron nitride and other boron bonded to nitrogen on the surface of graphite.

Thus, R1 (i.e., $S_{BN}/S_B$) of 0.5 or more means that 50% or more of boron on the surface of graphite is boron nitride or boron in a bonding state similar to that. Boron nitride with high chemical stability or boron in a bonding state similar to that on the surface of graphite can provide a graphite negative electrode with high durability.

The ratio R2 (i.e., $S_B/(S_B+S_C+S_N)$) is 0.05 or less, wherein $S_B$ denotes the total peak area of a boron 1s spectrum obtained by X-ray photoelectron spectroscopy, $S_C$ denotes the peak area of a carbon 1s spectrum, and $S_N$ denotes the peak area of a nitrogen 1s spectrum. This means that the ratio of the boron atoms to the boron, carbon, and nitrogen atoms on the surface of graphite is a certain value or less. Without correction for the difference in spectral intensity between elements, this means that the ratio of boron on the surface of graphite is 5% or less.

In a graphite negative electrode that satisfies these two relationships: (i) 50% or more of boron on the surface of graphite is boron nitride with high chemical stability or boron in a bonding state similar to that, and (ii) the ratio of boron on the surface of the graphite is a certain value (e.g., 5% without correction for the difference in spectral intensity between elements) or less. In such a graphite negative electrode, graphite has improved chemical stability, boron nitride is prevented from inhibiting the electrochemical reaction of graphite, and the negative-electrode active material has high capacity.

If less than 50% of boron on the surface of graphite is boron nitride or boron in a bonding state similar to that (i.e., R1<0.5), the chemical stability is insufficient. Insufficient chemical stability of the surface is likely to cause a side reaction with an electrolytic solution. It is conceivable that lithium ions are trapped (e.g., fixed) by boron-derived reactive sites on the surface of graphite and are not reversibly deintercalated by charge-discharge. This results in a decrease in capacity after repeated charge-discharge. If the ratio of boron on the surface of graphite is more than a certain value (e.g., R2>0.05), an increased amount of boron including boron nitride results in low electrochemical reactivity and a decreased discharge capacity.

In contrast, a negative-electrode active material for a non-aqueous secondary battery according to an embodiment of the present disclosure satisfies R1≥0.50 and R2≤0.05, and thereby a boron-containing graphite negative electrode has both high chemical stability and capacity. R1 is desirably 0.50≤R1≤0.72, which results in a smaller decrease in discharge capacity due to boron nitride on the surface, less side reactions between the graphite negative electrode and lithium ions on the surface of a boron-containing graphite negative electrode, and a negative-electrode active material with high chemical stability. R2 is desirably 0.007≤R2, which results in sufficient introduction of boron nitride on the surface of the graphite negative electrode, and a negative-electrode active material with sufficiently minimized side reactions between the graphite negative electrode and lithium ions. Furthermore, R2≤0.014 results in a negative-electrode active material with a high discharge capacity.

The boron content of the graphite is desirably 0.4% or more by mass and desirably 5% or less by mass. A graphite with a boron content of 5% or less by mass can suppress the formation of by-products not involved in adsorption or desorption of lithium ions and retain a high discharge capacity density. A graphite with a boron content of 0.4% or more by mass can contain sufficient boron nitride on its surface and have a sufficient side reaction suppressing effect. In consideration of reliability and the discharge capacity density, the graphite has a boron content in the range of 0.4% to 5% by mass, and desirably 0.4% to 0.5% by mass, for example.

X-ray photoelectron spectroscopy (XPS) analyzes the element composition and chemical bonding state of a surface of a sample by irradiating the surface of the sample with X-rays and measuring the kinetic energy of photoelectrons released from the surface of the sample. $S_{BN}$, $S_B$, $S_C$, and $S_N$ can be measured and calculated under the following conditions. A graphite C1 s spectrum (248.5 eV) can be used for energy calibration.

Measuring apparatus: PHI 5000 VersaProbe manufactured by ULVAC-PHI, Inc.

X-ray source: monochromatic Mg-Kα radiation, 200 nmΦ, 45 W, 17 kV

Area of analysis: approximately 200 μmΦ

Figure 4:
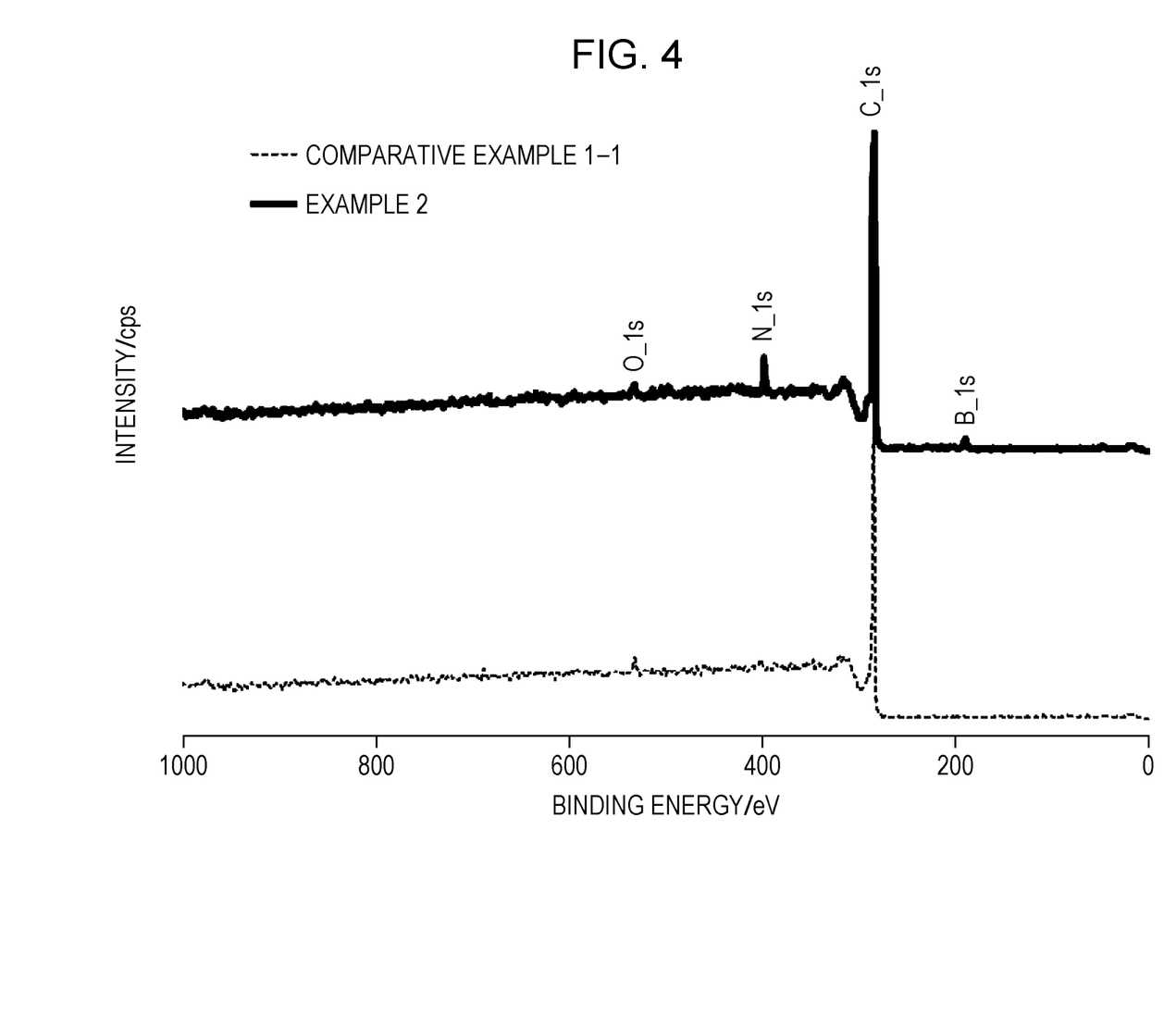
FIG. 4 is wide spectra of graphite of Comparative Example 1-1 and Example 2 obtained by X-ray photoelectron spectroscopy.

The total peak area $S_B$ of a boron 1s spectrum can be calculated as the total peak area of a spectrum in the binding energy range of 184.0 to 196.5 eV. Likewise, the peak area $S_C$ of a carbon 1s spectrum and the peak area $S_N$ of a nitrogen 1s spectrum can be calculated as the peak area of a spectrum in the binding energy range of 281.0 to 293.0 eV and as the peak area of a spectrum in the binding energy range of 394.0 to 402.0 eV, respectively. FIG. 4 is wide spectra of graphite of Comparative Example 1-1 and Example 2 described later obtained by X-ray photoelectron spectroscopy. For the sake of clarity, the wide spectrum of Comparative Example 1-1 is vertically separated from the wide spectrum of Example 2. In FIG. 4, the spectrum of the graphite of Example 2 includes a boron 1s spectrum (B_1s in the figure), a carbon 1s spectrum (C_1s in the figure), and a nitrogen 1s spectrum (N_1s in the figure). The peak areas $S_B$, $S_C$, and $S_N$ can be calculated by automatic integration from the boron 1s spectrum, the carbon 1s spectrum, and the nitrogen 1s spectrum, respectively.

Figure 5:
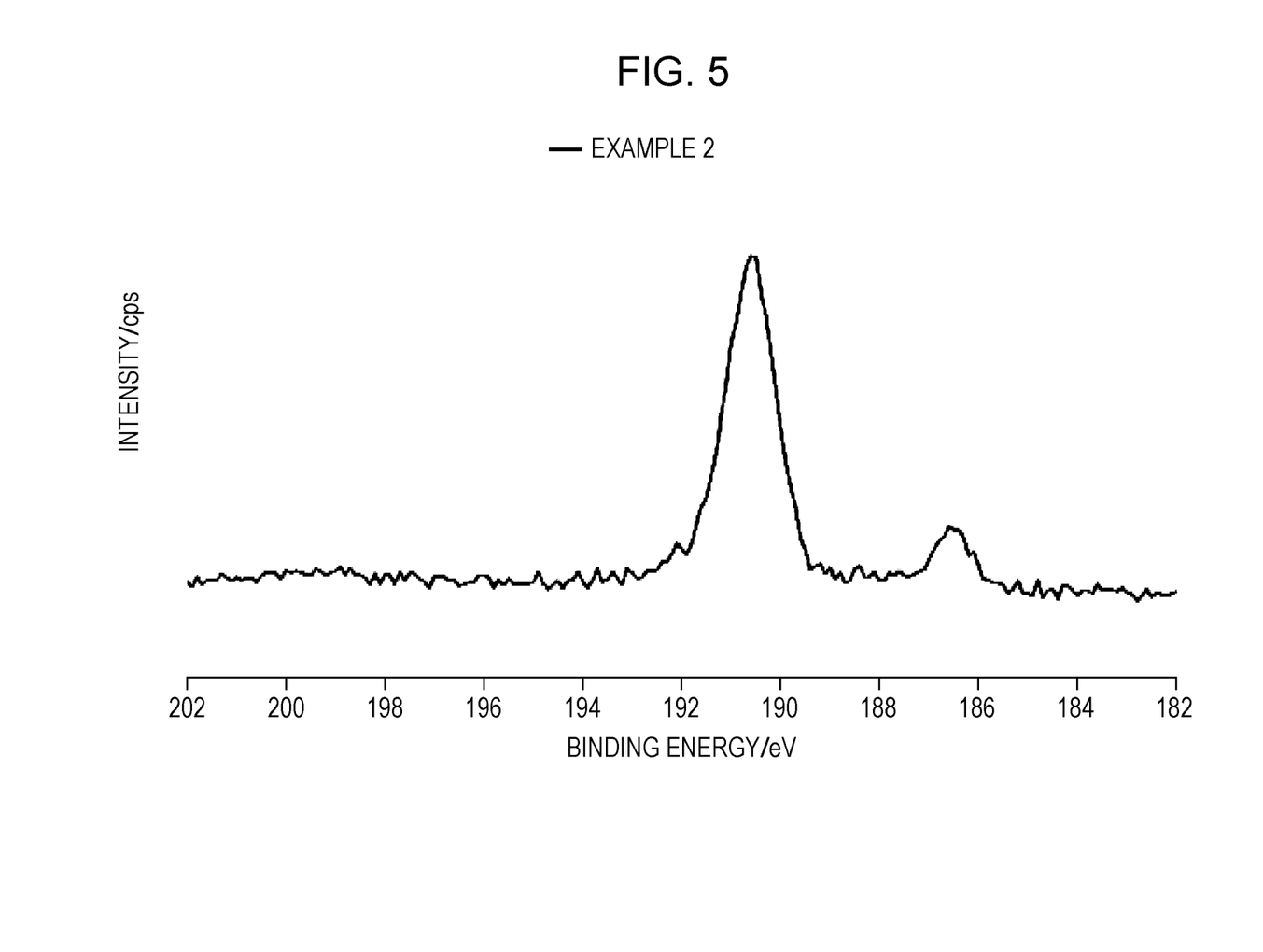
FIG. 5 is a narrow spectrum of the graphite of Example 2 obtained by X-ray photoelectron spectroscopy.
Figure 6:
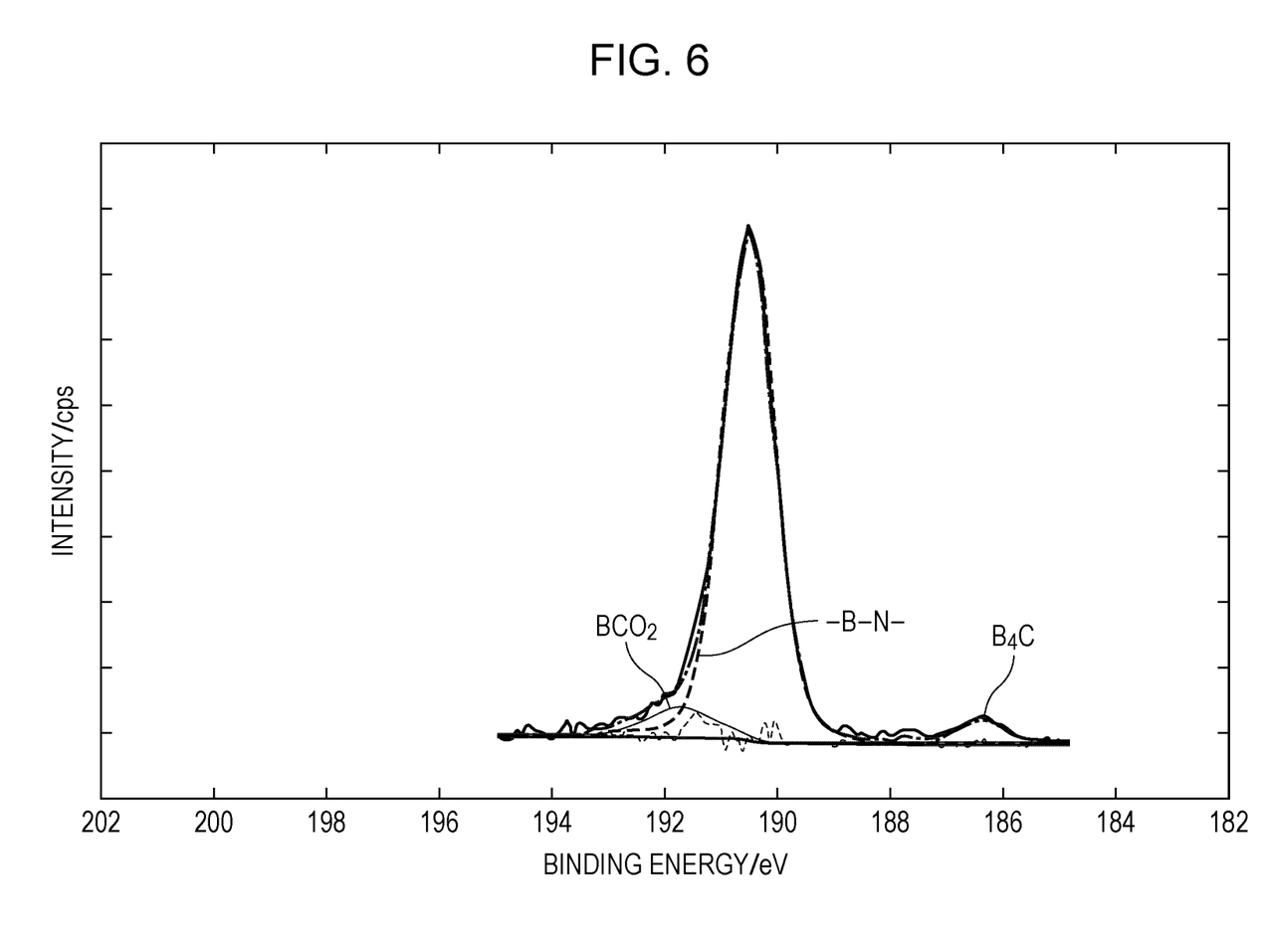
FIG. 6 is a result of separation of spectra in the boron $1s$ spectrum of FIG. 5.

In the boron 1s spectrum, a spectrum component with one or more peaks in the binding energy range of 189.0 to 192.0 eV is assigned to boron bonded to nitrogen. The peak area $S_{BN}$ can be calculated by separating the spectrum component with one or more peaks in the binding energy range of 189.0 to 192.0 eV from the boron 1s spectrum in the binding energy range of 184.0 to 196.5 eV and determining the area of the spectrum component. FIG. 5 is a boron 1s narrow spectrum of the graphite of Example 2 obtained by X-ray photoelectron spectroscopy. FIG. 6 is a result of separation of spectra corresponding to peaks with different chemical bonding states of boron in the boron 1s spectrum. As shown in FIG. 6, the boron 1s spectrum includes boron nitride (—B—N— in the figure), boron carbide ($B_4C$) and so forth.

The peak areas $S_B$ and $S_{BN}$ can be calculated from these spectra by automatic integration.

A negative-electrode active material can be synthesized, for example, by covering the surface of graphite with boron nitride and then removing part of the boron nitride from the surface by heat treatment. The heat-treatment temperature desirably ranges from 2000° C. to 2800° C. The surface of graphite can be covered with boron nitride by vapor deposition, such as chemical vapor deposition (CVD), sputtering, or atomic layer deposition (ALD), a sol-gel method, or a water thermal reaction, or with a ball mill. Alternatively, the surface of graphite can be covered with boron nitride by adding a boron raw material during firing of graphite and partially introducing nitrogen into the firing atmosphere. Alternatively, simultaneously with graphitization, the surface of graphite can be covered with boron nitride by adding a boron raw material to a carbon precursor material before graphitization and firing the carbon precursor material in an atmosphere containing nitrogen. It is desirable that firing at a temperature in the range of 2800° C. to 3000° C. in an atmosphere containing nitrogen allow boron in graphite to react with nitrogen, thereby converting boron on the surface layer of graphite into boron nitride.

Graphite is the generic name of a carbon material that contains a region having a structure including planes of carbon atoms arranged in hexagonal arrays with the planes stacked regularly. Examples of graphite include natural graphite, artificial graphite, and graphitized mesophase carbon particles. The (002) interplanar spacing $d_{002}$ (the interplanar spacing between planes of carbon atoms) measured by X-ray diffractometry is utilized as a measure of the growth of a graphite crystal structure. In general, highly crystalline carbon with $d_{002}$ of 3.4 angstroms or less and a crystallite size of 100 angstroms or more is referred to as graphite. The crystallite size can be measured by the Scherrer method, for example.

The carbon precursor material may be soft carbon, such as petroleum coke or coal coke. The soft carbon may have the shape of sheet, fiber, or particles. The carbon precursor material may be synthetic resin having the shape of particles or short fibers in size of a few to tens of micrometers, in consideration of processing after firing. Carbon serving as a raw material can also be produced by heat-treating an organic material, such as a synthetic resin, at a temperature in the range of approximately 800° C. to 1000° C. to evaporate elements other than carbon.

Examples of the boron raw material include boron, boric acid, boron oxide, boron nitride, and diborides, such as aluminum diboride and magnesium diboride. The mass ratio of boron to carbon in the carbon and boron raw materials may range from 0.4% to 5%. During high-temperature firing, part of boron is sometimes not incorporated into the carbon material and volatilizes. Thus, the boron content of the carbon material may be decreased by firing. The boron raw material may be added after graphitization of the carbon precursor material.

A non-aqueous secondary battery containing the negative-electrode active material will be described below. The non-aqueous secondary battery includes a positive electrode, a negative electrode, and a non-aqueous electrolytic solution.

The positive electrode contains a positive-electrode active material that can intercalate and deintercalate alkali metal ions. The negative electrode contains a negative-electrode active material. The negative-electrode active material contains graphite that contains boron and nitrogen on its surface and that has R1 and R2 satisfying the conditions described above. The non-aqueous electrolytic solution contains an alkali metal salt composed of an alkali metal ion and an anion dissolved in a non-aqueous solvent. The alkali metal ion may be a lithium ion.

Such a non-aqueous secondary battery can have a high energy density and high reliability.

Figure 1:
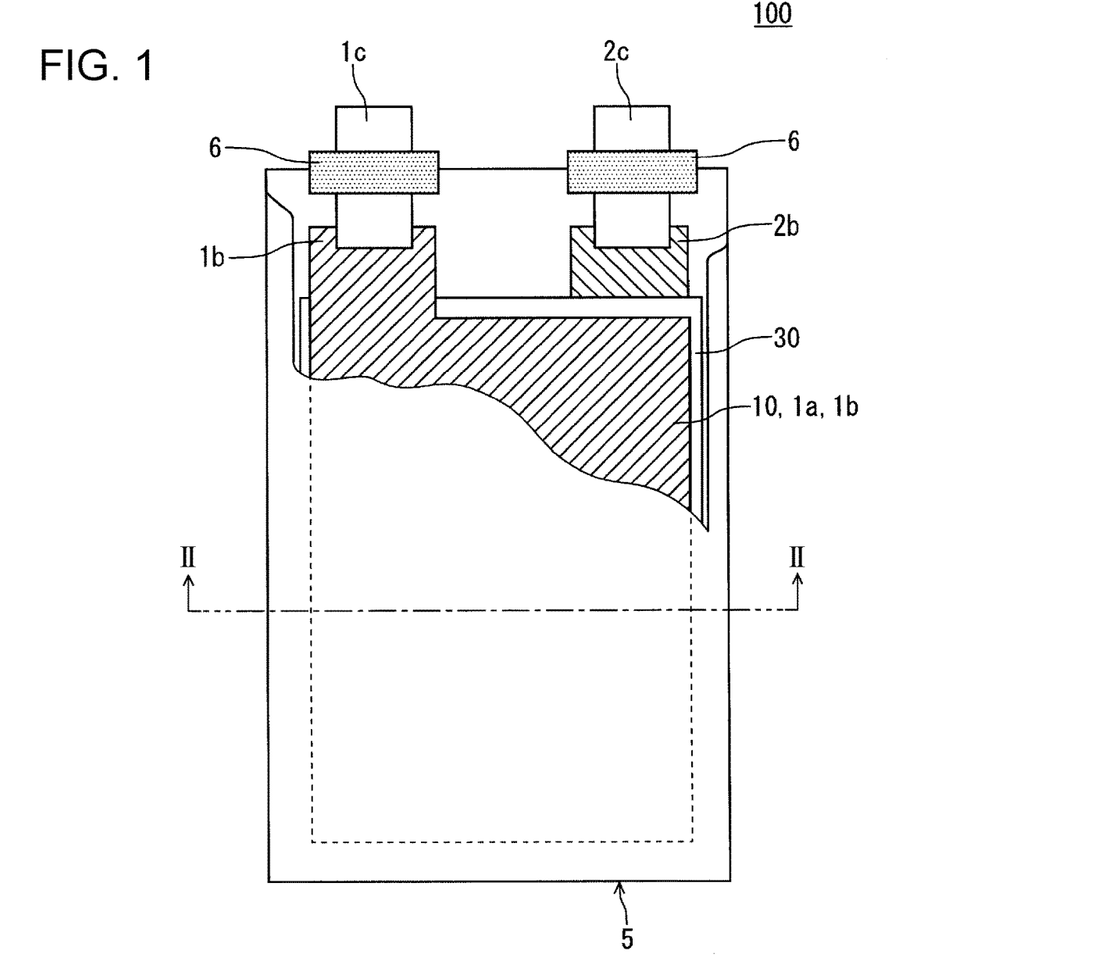
FIG. 1 is a schematic cutaway plan view illustrating the structure of a non-aqueous secondary battery according to one embodiment of the present disclosure.
Figure 2:
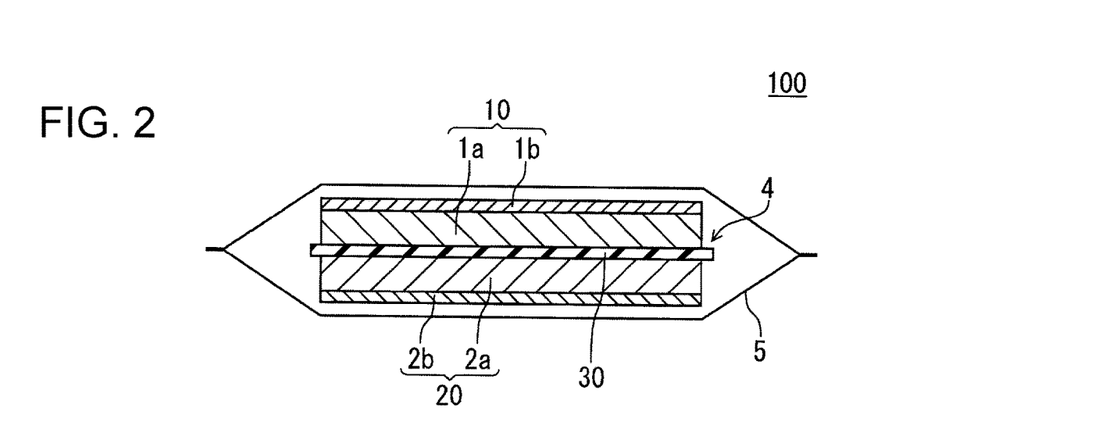
FIG. 2 is a cross-sectional view taken along the line II-II of the non-aqueous secondary battery illustrated in FIG. 1.

A lithium-ion secondary battery will be described below with reference to FIGS. 1 and 2 as an example of a non-aqueous secondary battery according to one embodiment of the present disclosure. FIG. 1 is a schematic cutaway plan view of a non-aqueous secondary battery (for example, a lithium-ion secondary battery). FIG. 2 is a cross-sectional view taken along the line II-II of FIG. 1.

As illustrated in FIGS. 1 and 2, a lithium-ion secondary battery 100 is a sheet-type battery and includes an electrode assembly 4 and a casing 5 for the electrode assembly 4.

The electrode assembly 4 includes a positive electrode 10, a separator 30, and a negative electrode 20 stacked in this order. The positive electrode 10 faces the negative electrode 20 with the separator 30 interposed therebetween. The electrode assembly 4 is thus formed. The electrode assembly 4 is impregnated with a non-aqueous electrolytic solution (not shown).

The positive electrode 10 includes a positive-electrode mixture layer 1a and a positive-electrode current collector 1b. The positive-electrode mixture layer 1a is formed on the positive-electrode current collector 1b.

The negative electrode 20 includes a negative-electrode mixture layer 2a and a negative-electrode current collector 2b. The negative-electrode mixture layer 2a is formed on the negative-electrode current collector 2b.

The positive-electrode current collector 1b is connected to a positive-electrode tape automated bonding (tab) lead 1c, and the negative-electrode current collector 2b is connected to a negative-electrode tab lead 2c. The positive-electrode tab lead 1c and the negative-electrode tab lead 2c extend outside the casing 5.

The spaces between the positive-electrode tab lead 1c and the casing 5 and between the negative-electrode tab lead 2c and the casing 5 are insulated by an insulating tab film 6.

The positive-electrode mixture layer 1a contains a positive-electrode active material that can intercalate and deintercalate alkali metal ions. The positive-electrode mixture layer 1a may contain a conductive aid, an ionic conductor, and a binder, as required. The positive-electrode active material, conductive aid, ionic conductor, and binder may contain any known material.

The positive-electrode active material may be any material that can intercalate and deintercalate one or more alkali metal ions, for example, a transition metal oxide, a transition metal fluoride, a polyanionic material, a fluorinated polyanionic material, or a transition metal sulfide, each containing an alkali metal. For example, the positive-electrode active material is a lithium-containing transition metal oxide, a lithium-containing polyanionic material, or a sodium-containing transition metal oxide. The lithium-containing transition metal oxide is, for example, $Li_xMe_yO_2$ or $Li_{1+x}Me_yO_3$ (where x satisfies $0<x\leq1$, y satisfies $0.95\leq y<1.05$, and Me contains at least one selected from the group consisting of Co, Ni, Mn, Fe, Cr, Cu, Mo, Ti, and Sn). The a lithium-containing polyanionic material is, for example, $Li_xMe_yPO_4$ or $Li_xMe_yP_2O_7$ (where x satisfies $0<x\leq1$, y satisfies $0.95\leq y<1.05$, and Me contains at least one selected from the group consisting of Co, Ni, Mn, Fe, Cu, and Mo). The a sodium-containing transition metal oxide is, for example, $Na_xMe_yO_2$ (where x satisfies $0<x\leq1$, y satisfies $0.95\leq y<1.05$, and Me contains at least one selected from the group consisting of Co, Ni, Mn, Fe, Cr, Cu, Mo, Ti, and Sn).

The positive-electrode current collector 1b may be a porous or nonporous sheet or film formed of a metal material, such as aluminum, an aluminum alloy, stainless steel, nickel, or a nickel alloy. Aluminum and alloys thereof, which are inexpensive and can be easily formed into a thin film, are suitable for the positive-electrode current collector 1b. In order to decrease the resistance, provide catalytic effects, and strengthen the bonding between the positive-electrode mixture layer 1a and the positive-electrode current collector 1b, a carbon material, such as carbon, may be applied to the positive-electrode current collector 1b.

The negative-electrode mixture layer 2a contains a graphite material containing boron and nitrogen according to the present embodiment at least on its surface as a negative-electrode active material. The negative-electrode mixture layer 2a may further contain another negative-electrode active material that can intercalate and deintercalate alkali metal ions, as required. The negative-electrode mixture layer 2a may contain a conductive aid, an ionic conductor, and a binder, as required. The active materials, conductive aid, ionic conductor, and binder may contain any known material.

A negative-electrode active material that may be used in combination with a negative-electrode active material according to the present embodiment may be a material that intercalates and deintercalates alkali metal ions or may be an alkali metal. The material that intercalates and deintercalates alkali metal ions may be an alkali metal alloy, carbon, a transition metal oxide, or a silicon material. More specifically, the negative-electrode material for a lithium secondary battery may be an alloy of a metal, such as Zn, Sn, or Si, and lithium, carbon, such as artificial graphite, natural graphite, or non-graphitizable amorphous carbon, a transition metal oxide, such as $Li_4Ti_5O_{12}$, $TiO_2$, or $V_2O_5$, $SiO_x$ ($0<x\leq2$), or lithium metal.

Examples of the conductive aid include carbon materials, such as carbon black, graphite, and acetylene black, and electrically conductive polymers, such as polyaniline, polypyrrole, and polythiophene. Examples of the ionic conductor include gel electrolytes, such as poly(methyl methacrylate), and solid electrolytes, such as poly(ethylene oxide), lithium phosphate, and lithium phosphorus oxynitride (LiPON). Examples of the binder include poly(vinylidene difluoride), vinylidene fluoride-hexafluoropropylene copolymers, vinylidene fluoride-tetrafluoroethylene copolymers, polytetrafluoroethylene, carboxymethylcellulose, poly(acrylic acid), styrene-butadiene copolymer rubber, polypropylene, polyethylene, and polyimide.

The negative-electrode current collector 2b may be a porous or nonporous sheet or film formed of a metal material, such as aluminum, an aluminum alloy, stainless steel, nickel, a nickel alloy, copper, or a copper alloy. Copper and alloys thereof, which are stable at the operating potential of the negative electrode and are relatively inexpensive, are suitable for the material of the negative-electrode current collector 2b. The sheet or film may be a metal foil or metal mesh. In order to decrease the resistance, provide catalytic effects, and strengthen the bonding between the negative-electrode mixture layer 2a and the negative-electrode current collector 2b, a carbon material, such as carbon, may be applied to the negative-electrode current collector 2b.

The separator 30 may be a porous film formed of polyethylene, polypropylene, glass, cellulose, or ceramic. The pores of the separator 30 are filled with a non-aqueous electrolytic solution.

The non-aqueous electrolytic solution is a solution of an alkali metal salt in a non-aqueous solvent. The non-aqueous solvent may be a known cyclic carbonate, chain carbonate, cyclic carboxylate, chain carboxylate, chain nitrile, cyclic ether, or chain ether. The non-aqueous solvent desirably contains a cyclic carbonate and a chain carbonate in terms of the solubility of a Li salt and viscosity.

Examples of the cyclic carbonate include ethylene carbonate, fluoroethylene carbonate, propylene carbonate, butylene carbonate, vinylene carbonate, vinyl ethylene carbonate, and derivatives thereof. These may be used alone or in combination. From the perspective of the ionic conductivity of the electrolytic solution, it is desirable to use at least one selected from the group consisting of ethylene carbonate, fluoroethylene carbonate, and propylene carbonate.

Examples of the chain carbonate include dimethyl carbonate, ethyl methyl carbonate, and diethyl carbonate. These may be used alone or in combination.

Examples of the cyclic carboxylate include γ-butyrolactone and γ-valerolactone. These may be used alone or in combination.

Examples of the chain carboxylate include methyl acetate, ethyl acetate, propyl acetate, methyl propionate, ethyl propionate, and propyl propionate. These may be used alone or in combination.

Examples of the chain nitrile include acetonitrile, propionitrile, butyronitrile, valeronitrile, isobutyronitrile, and pivalonitrile. These may be used alone or in combination.

Examples of the cyclic ether include 1,3-dioxolane, 1,4-dioxolane, tetrahydrofuran, and 2-methyltetrahydrofuran. These may be used alone or in combination.

Examples of the chain ether include 1,2-dimethoxyethane, dimethyl ether, diethyl ether, dipropyl ether, ethyl methyl ether, diethylene glycol dimethyl ether, diethylene glycol diethyl ether, and diethylene glycol dibutyl ether. These may be used alone or in combination.

The hydrogen atoms of these solvents may be partly substituted with fluorine. Thus, these solvents may be fluorinated solvents. A solvent containing fluorine produced by substitution of part of the hydrogen atoms with fluorine provides a denser film on the negative electrode. Such a dense film on the negative electrode can suppress the continuous decomposition of the electrolytic solution and can thereby provide a reliable secondary battery with less side reactions.

Examples of the alkali metal salt to be dissolved in the non-aqueous solvent include lithium salts, such as $LiClO_4$, $LiBF_4$, $LiPF_6$, $LiN(SO_2F)_2$, $LiN(SO_2CF_3)_2$, and lithium bisoxalate borate (LiBOB), and sodium salts, such as $NaClO_4$, $NaBF_4$, $NaPF_6$, $NaN(SO_2F)_2$, and $NaN(SO_2CF_3)_2$. In particular, it is desirable to use a lithium salt in terms of the overall characteristics of the non-aqueous electrolytic solution secondary battery. It is particularly desirable to use at least one selected from the group consisting of $LiBF_4$, $LiPF_6$, and $LiN(SO_2F)_2$ in terms of ionic conductivity.

The number of moles of alkali metal salt in the non-aqueous electrolytic solution in the present embodiment is desirably, but not limited to, in the range of 0.5 to 2.0 mol/L. It is reported that high-salt-concentration electrolytic solutions with a mole ratio of an alkali metal salt to solvent being in the range of 1:1 to 1:4 can also be used for charge-discharge in the same manner as in ordinary electrolytic solutions. Thus, such a high-concentration electrolytic solution may also be used.

There are various types (e.g., shapes) of secondary batteries, such as a coin type, a button type, a multilayer type, a cylindrical type, a flat type, and a square or rectangular type, as well as a sheet type illustrated in FIGS. 1 and 2. A non-aqueous secondary battery according to the present embodiment can be applied to a non-aqueous secondary battery of any shape. The uses of a secondary battery according to the present embodiment include, but are not limited to, personal digital assistants, portable electronic devices, household power storage systems, industrial power storage systems, motorcycles, electric vehicles (EVs), and plug-in hybrid electric vehicles (PHEVs).

The embodiments of the present disclosure will be further described in the following examples.

Example 1

(1) Synthesis of Negative-Electrode Active Material

A petroleum coke powder with an average particle size of 12 µm and boric acid (CAS No. 10043-35-3) were ground in an agate mortar. The boric acid was 20% by mass of the petroleum coke powder (boron was 3.4% by mass of the petroleum coke powder). Firing was then performed in an Acheson furnace at 2800° C. Subsequently, heating was stopped. After natural cooling, the carbon material was removed from the furnace. The carbon material thus produced was ground in an agate mortar and was classified through a stainless steel standard sieve with an opening of 40 µm. Thus, a negative-electrode active material for a non-aqueous secondary battery was produced.

The graphite in the negative-electrode active material had a boron content of 0.5% by mass as determined by inductively coupled plasma (ICP) spectrometry. The presence of boron was thus confirmed.

An analysis of the boron $1s$ spectrum by X-ray photoelectron spectroscopy (XPS) showed $R1=S_{BN}/S_B=0.72$, and $R2=S_B/(S_B+S_C+S_N)=0.014$.

(2) Preparation of Test Electrode

The graphite material for a non-aqueous secondary battery negative electrode produced by the synthesis method, carboxymethylcellulose (CAS No. 9000-11-7), and a styrene-butadiene copolymer rubber (CAS No. 9003-55-8) were dispersed in pure water at a weight ratio of 97:2:1 to prepare a slurry. The slurry was applied to the negative-electrode current collector 2b formed of a copper foil 10 µm in thickness with a coating machine and was rolled with a rolling mill to form an electrode sheet.

Figure 3A:
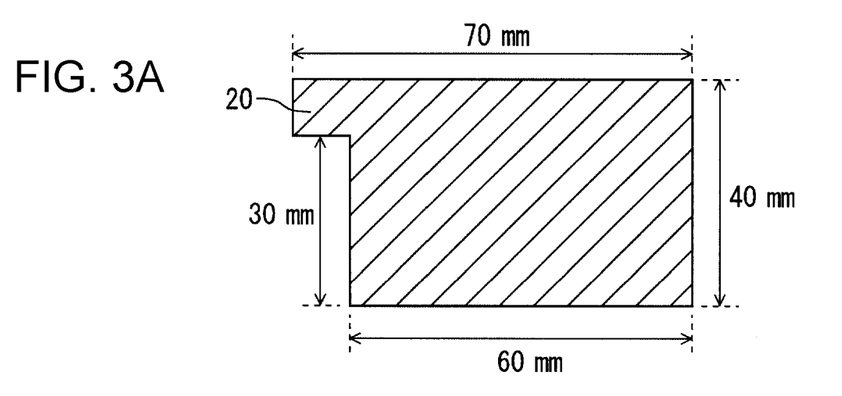
FIG. 3A is an explanatory view of a method for preparing a negative electrode for performance evaluation.
Figure 3B:
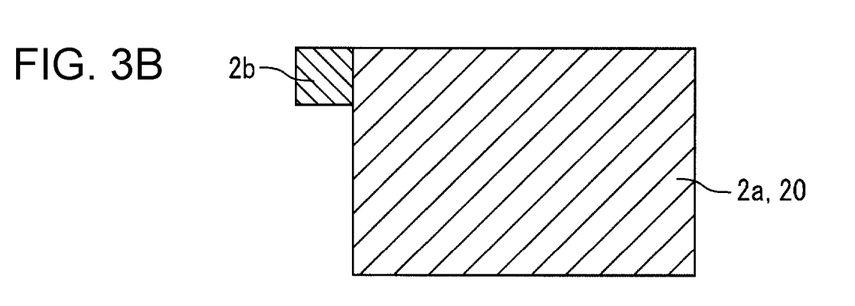
FIG. 3B is an explanatory view of a method for preparing a negative electrode for performance evaluation.
Figure 3C:
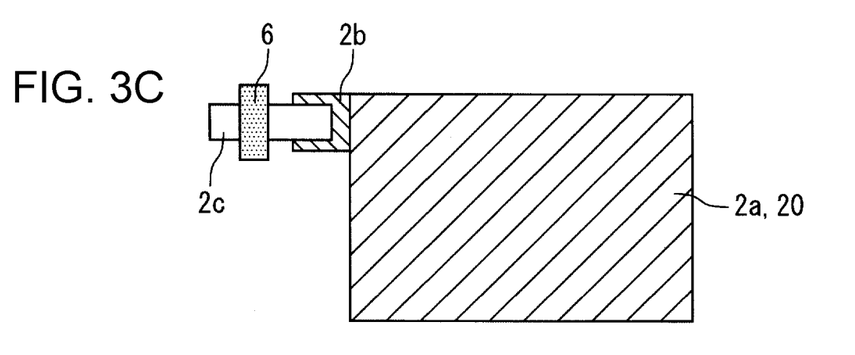
FIG. 3C is an explanatory view of a method for preparing a negative electrode for performance evaluation.

The rolled electrode sheet was cut in the shape illustrated in FIG. 3A to prepare the negative electrode 20 for performance evaluation. In FIG. 3A, a 60 mm×40 mm region functions as a negative electrode, and a 10 mm×10 mm protrusion is a connection region to be connected to the tab lead 2c. As illustrated in FIG. 3B, a portion of the negative-electrode mixture layer 2a on the connection region was scraped off to expose the negative-electrode current collector (copper foil) 2b. As illustrated in FIG. 3C, the exposed portion of the negative-electrode current collector (copper foil) 2b was connected to the negative-electrode tab lead 2c, and a predetermined region around the negative-electrode tab lead 2c was covered with an insulating tab film 6.

(3) Preparation of Non-Aqueous Electrolytic Solution

In a mixed solvent of fluoroethylene carbonate (CAS No. 114435-02-8) and dimethyl carbonate (CAS No. 616-38-6) (volume ratio: 1:4), 1.2 mol/L $LiPF_6$ (CAS No. 21324-40-3) was dissolved to prepare an electrolytic solution. The electrolytic solution was prepared in an Ar atmosphere in a glove box at a dew point of −60° C. or less and at an oxygen level of 1 ppm or less.

(4) Preparation of Evaluation Cell

The negative electrode for performance evaluation was used to prepare a half-cell for negative electrode evaluation. The half-cell included a lithium metal counter electrode. The evaluation cell was prepared in an Ar atmosphere in a glove box at a dew point of −60° C. or less and at an oxygen level of 1 ppm or less.

The negative electrode for performance evaluation connected to the negative-electrode tab lead 2c was put on the Li metal counter electrode connected to a nickel tab lead with a polypropylene separator 30 (30 µm in thickness) interposed therebetween to form an electrode assembly 4.

A 120×120 mm rectangular Al laminated film (100 µm in thickness) was folded in half. An end portion on the 120-mm long side was heat-sealed at 230° C. to form a 120×60 mm envelope. The electrode assembly 4 was inserted into the envelope through a 60-mm short side. An end face of the Al laminated film and a hot-melt resin of the tab leads 1c and 2c were aligned and heat-sealed at 230° C. Subsequently, 0.3 $cm^3$ of a non-aqueous electrolytic solution was injected through an unsealed short side of the Al laminated film. Standing at a reduced pressure of 0.06 MPa for 15 minutes allowed the negative-electrode mixture layer 2a to be impregnated with the electrolytic solution. Finally, the unsealed end face of the Al laminated film was heat-sealed at 230° C.

(5) Evaluation of Battery Performance

The electrode assembly 4 in the laminate was placed between 80×80 cm stainless steel sheets (2 mm in thickness), and the evaluation cell was pressurized with clamps at 0.2 MPa. The evaluation was performed in a thermostat at 25° C.

Four cycles of charge-discharge were performed at a limited charge-discharge current with a current density of 20 mA per mass of the negative-electrode active material. Charging was completed at a negative-electrode potential of 0.0 V (vs. Li counter electrode), and discharging was completed at a negative-electrode potential of 1.0 V (vs. Li counter electrode). The battery was left standing in an open circuit for 20 minutes between charging and discharging.

Another cycle of charge-discharge was then performed under the same conditions and was confirmed to remain stable in the charge-discharge capacity. In this fifth cycle, the discharge capacity per mass of the graphite was determined. Subsequently, 30 cycles of charge-discharge were performed at 45° C. The 30-cycle cumulative irreversible capacity was determined as a side reaction amount.

Example 2

The graphite produced in Example 1 was heat-treated at 2300° C. in an Ar atmosphere to remove part of boron nitride from the surface, thereby producing a negative-electrode active material.

The graphite in the negative-electrode active material had a boron content of 0.4% by mass as determined by ICP spectrometry. The presence of boron was thus confirmed.

An analysis of the boron $1s$ spectrum by X-ray photoelectron spectroscopy (XPS) showed $R1=S_{BN}/S_B=0.50$, and $R2=S_B/(S_B+S_C+S_N)=0.007$.

Comparative Example 1-1

A negative-electrode active material for a non-aqueous secondary battery was synthesized in the same manner as in Example 1 except that no boric acid was added in the synthesis of graphite.

No boron was detected by ICP spectrometry.

Comparative Example 1-2

The graphite produced in Comparative Example 1 was mixed with 0.1% by mass of boric acid and was heat-treated at 1000° C. in an Ar atmosphere to produce a negative-electrode active material.

The graphite in the negative-electrode active material had a boron content of 0.05% by mass as determined by ICP spectrometry. The presence of boron was thus confirmed.

An analysis of the boron 1s spectrum by X-ray photoelectron spectroscopy (XPS) showed $R1=S_{BN}/S_B=0.0$, and $R2=S_B/(S_B+S_C+S_N)=0.013$.

Comparative Example 1-3

The graphite produced in Example 1 was heat-treated at 1900° C. in an Ar atmosphere to remove part of boron nitride from the surface, thereby producing a negative-electrode active material.

The graphite in the negative-electrode active material had a boron content of 0.3% by mass as determined by inductively coupled plasma (ICP) spectrometry. The presence of boron was thus confirmed.

An analysis of the boron 1s spectrum by X-ray photoelectron spectroscopy (XPS) showed $R1=S_{BN}/S_B=0.36$, and $R2=S_B/(S_B+S_C+S_N)=0.007$.

Comparative Example 1-4

A negative-electrode active material was produced by synthesizing graphite in the same manner as in Example 1 except that the amount of boric acid was changed from 20% by mass to 30% by mass.

The graphite in the negative-electrode active material had a boron content of 4.6% by mass as determined by inductively coupled plasma (ICP) spectrometry. The presence of boron was thus confirmed.

An analysis of the boron 1s spectrum by X-ray photoelectron spectroscopy (XPS) showed $R1=S_{BN}/S_B=0.53$, and $R2=S_B/(S_B+S_C+S_N)=0.054$.

Batteries containing these negative-electrode active materials were produced in the same manner as in the battery of Example 1 and were tested as described above. Table 1 shows the results.

As shown in Table 1, a durable secondary battery with a smaller decrease in discharge capacity and a side reaction amount of less than 20 mAh/g can be provided when the ratio R1 of $S_{BN}$ to $S_B$ is 0.5 or more, wherein $S_B$ denotes the total peak area of the boron 1s spectrum obtained by X-ray photoelectron spectroscopy, and $S_{BN}$ denotes the peak area of a spectrum assigned to boron bonded to nitrogen and having one or more peaks in the binding energy range of 189.0 to 192.0 eV in the boron 1s spectrum.

A comparison of Example 1 with Example 2 shows that Example 1 with a higher R1 had a larger side reaction amount. This is probably because Example 1 had a higher R2 than Example 2. More specifically, the amount of chemically unstable boron (1−R1)R2 on the surface other than boron bonded to nitrogen (such as boron nitride) is larger in Example 1 than Example 2. A comparison of Comparative Example 1-2 and Example 1, which had almost the same R2, shows that the side reaction amount in Example 1 was less than half that of Comparative Example 1-2.

R1 of less than 0.5 resulted in a large side reaction amount of 22 mAh/g or more. R1 of less than 0.5 probably results in insufficient boron nitride on the surface of graphite and a smaller side reaction suppressing effect. Comparative Example 1-3 had the same R2 as Example 2 but had R1 of less than 0.5. Thus, Comparative Example 1-3 had a higher side reaction amount than Comparative Example 1-1, which contained no boron.

A high discharge capacity of 343 mAh/g or more was achieved when R1 was 0.5 or more and R2 ($S_B/(S_B+S_C+S_N)$) was 0.05 or less, wherein $S_B$ denotes the total peak area of the boron 1s spectrum obtained by X-ray photoelectron spectroscopy, $S_C$ denotes the peak area of the carbon 1s spectrum, and $S_N$ denotes the peak area of the nitrogen 1s spectrum. In contrast, R2 of more than 0.05 resulted in a low discharge capacity. In Comparative Example 1-4, which had R1 of 0.5 or more but R2 of more than 0.05, excessive chemically stable boron, such as boron nitride, on the surface inhibited the electrochemical reaction and resulted in an insufficient discharge capacity.

These results show that high discharge capacity and chemically durability can be simultaneously achieved when $R1=S_{BN}/S_B$ is 0.5 or more, and $R2=S_B/(S_B+S_C+S_N)$ is 0.05 or less.

TABLE 1

| Negative-electrode active material | R1 | R2 | Discharge capacity mAh/g | Side reaction amount mAh/g |
|---|---|---|---|---|
| Example 1 | 0.72 | 0.014 | 343 | 18 |
| Example 2 | 0.50 | 0.007 | 343 | 15 |
| Comparative example 1-1 | 0 | 0 | 347 | 22 |
| Comparative example 1-2 | 0 | 0.013 | 343 | 38 |
| Comparative example 1-3 | 0.36 | 0.007 | 330 | 24 |
| Comparative example 1-4 | 0.53 | 0.054 | 262 | 22 |

The non-aqueous electrolytic solution may contain a fluorinated ester (for example, a chain carboxylate having at least one fluorine group).

A negative-electrode active material according to the present disclosure can be utilized in non-aqueous secondary batteries and is particularly useful as a negative-electrode material for non-aqueous secondary batteries, such as lithium-ion secondary batteries.

What is claimed is:

1. A negative-electrode active material for a non-aqueous secondary battery, the negative-electrode active material comprising a graphite including boron and nitrogen, wherein
a ratio R1 satisfies $0.5 \leq R1 \leq 1$, where $R1=S_{BN}/S_B$, and $S_B$ denotes a total peak area of a boron 1s spectrum of the graphite obtained by X-ray photoelectron spectroscopy, and $S_{BN}$ denotes a peak area of a spectrum assigned to boron bonded to nitrogen in the boron 1s spectrum, and
a ratio R2 satisfies $0 < R2 \leq 0.05$, where $R2=S_B/(S_B+S_C+S_N)$, and $S_C$ denotes a peak area of a carbon 1s spectrum of the graphite obtained by X-ray photoelectron spectroscopy, and $S_N$ denotes a peak area of a nitrogen 1s spectrum of the graphite obtained by X-ray photoelectron spectroscopy.

2. The negative-electrode active material according to claim 1, wherein the graphite includes the boron in an amount of not less than 0.4% by mass and not more than 5% by mass of a total amount of the graphite.

3. The negative-electrode active material according to claim 1, wherein R1 satisfies $0.5 \leq R1 \leq 0.72$.

4. The negative-electrode active material according to claim 2, wherein R1 satisfies $0.5 \leq R1 \leq 0.72$.

5. The negative-electrode active material according to claim 1, wherein R2 satisfies 0.007≤R2≤0.014.

6. The negative-electrode active material according to claim 2, wherein R2 satisfies 0.007≤R2≤0.014.

7. The negative-electrode active material according to claim 3, wherein R2 satisfies 0.007≤R2≤0.014.

8. The negative-electrode active material according to claim 4, wherein R2 satisfies 0.007≤R2≤0.014.

9. A non-aqueous secondary battery comprising:
a positive electrode containing a positive-electrode active material that intercalates and deintercalates alkali metal ions;
a negative electrode containing a negative-electrode active material; and
a non-aqueous electrolytic solution containing an alkali metal salt of an alkali metal ion and an anion, wherein
the negative-electrode active material comprises a graphite including boron and nitrogen,
a ratio R1 satisfies 0.5≤R1≤1, where R1=$S_{BN}/S_B$, and $S_B$ denotes a total peak area of a boron 1s spectrum of the graphite obtained by X-ray photoelectron spectroscopy, and $S_{BN}$ denotes a peak area of a spectrum assigned to boron bonded to nitrogen in the boron 1s spectrum, and
a ratio R2 satisfies 0<R2≤0.05, where R2=$S_B/(S_B+S_C+S_N)$, and $S_C$ denotes a peak area of a carbon 1s spectrum of the graphite obtained by X-ray photoelectron spectroscopy, and $S_N$ denotes a peak area of a nitrogen 1s spectrum of the graphite obtained by X-ray photoelectron spectroscopy.

10. The non-aqueous secondary battery according to claim 9, wherein the graphite includes the boron in an amount of not less than 0.4% by mass and not more than 5% by mass of a total amount of the graphite.

11. The non-aqueous secondary battery according to claim 9, wherein R1 satisfies 0.5≤R1≤0.72.

12. The non-aqueous secondary battery according to claim 10, wherein R1 satisfies 0.5≤R1≤0.72.

13. The non-aqueous secondary battery according to claim 9, wherein R2 satisfies 0.007≤R2≤0.014.

14. The non-aqueous secondary battery according to claim 10, wherein R2 satisfies 0.007≤R2≤0.014.

15. The non-aqueous secondary battery according to claim 11, wherein R2 satisfies 0.007≤R2≤0.014.

16. The non-aqueous secondary battery according to claim 12, wherein R2 satisfies 0.007≤R2≤0.014.

17. The non-aqueous secondary battery according to claim 9, wherein the alkali metal ions are lithium ions.

* * * * *